(12) United States Patent
Miller et al.

(10) Patent No.: US 11,996,234 B2
(45) Date of Patent: May 28, 2024

(54) COUPLING SYSTEM FOR HAND HELD DEVICE AND BASE

(71) Applicant: KONINKLIJKE PHILIPS N.V., Eindhoven (NL)

(72) Inventors: Jason Daniel Miller, Seattle, WA (US); Ryan Richard Johnson, Bothell, WA (US); Adrian Toma, Ede (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 277 days.

(21) Appl. No.: 17/636,994

(22) PCT Filed: Aug. 19, 2020

(86) PCT No.: PCT/EP2020/073140
§ 371 (c)(1),
(2) Date: Feb. 21, 2022

(87) PCT Pub. No.: WO2021/032758
PCT Pub. Date: Feb. 25, 2021

(65) Prior Publication Data
US 2022/0367096 A1    Nov. 17, 2022

Related U.S. Application Data

(60) Provisional application No. 62/889,122, filed on Aug. 20, 2019.

(51) Int. Cl.
*H01F 7/02* (2006.01)
*H02J 7/00* (2006.01)

(52) U.S. Cl.
CPC ......... *H01F 7/0247* (2013.01); *H01F 7/0252* (2013.01); *H02J 7/0044* (2013.01)

(58) Field of Classification Search
CPC ..... H01F 7/0247; H01F 7/0252; H02J 7/0044
See application file for complete search history.

(56) References Cited

U.S. PATENT DOCUMENTS

2009/0278642 A1* 11/2009 Fullerton .............. H01F 13/003
335/284
2012/0112018 A1    5/2012 Barry et al.
(Continued)

FOREIGN PATENT DOCUMENTS

WO    WO-2020145301 A1 *  7/2020

OTHER PUBLICATIONS

International Search Report and Written Opinion dated Nov. 6, 2020 for International Application No. PCT/EP2020/073140, Filed Aug. 19, 2020.
(Continued)

*Primary Examiner* — Mohamad A Musleh

(57) ABSTRACT

The present disclosure is directed to a magnetic coupling system to improve stability at low magnetic docking forces, such as docking between a hand held device (102) and its base (104), where the hand held device and the base each contain a magnet (112, 108) with the same direction of polarity, arranged so that the two magnets attract each other when the hand held device is docked to the base. An auxiliary magnet (114) is included in the magnetic coupling system. In one example, the auxiliary magnet may be arranged within the hand held device at a predetermined distance from the other magnet within the hand held device and is arranged with polarity in the opposite directions as the other two magnets. In another example, the auxiliary magnet may be arranged within the base at a predetermined distance from the other magnet within the base and is arranged with polarity in the opposite direction as the other two magnets.

11 Claims, 3 Drawing Sheets

(56) References Cited

U.S. PATENT DOCUMENTS

| | | |
|---|---|---|
| 2012/0181876 A1 | 7/2012 | Baarman et al. |
| 2015/0102879 A1 | 4/2015 | Jacobs et al. |
| 2017/0209234 A1 | 7/2017 | Senff et al. |
| 2017/0273597 A1* | 9/2017 | Schuelke ............. A61B 5/7405 |
| 2017/0301446 A1* | 10/2017 | Chaizy ................. H01F 7/0263 |
| 2018/0168784 A1 | 6/2018 | Wagner et al. |
| 2018/0193108 A1 | 7/2018 | Guenst et al. |
| 2018/0307272 A1 | 10/2018 | Lee |
| 2018/0307275 A1 | 10/2018 | Peil et al. |
| 2019/0006893 A1 | 1/2019 | Shaw et al. |
| 2019/0215975 A1* | 7/2019 | Alva .................... H01F 7/0252 |

OTHER PUBLICATIONS

Jon Love, "Belmint Home Sleek Home Review" url: https://www.electricteeth.com/belmint-home-sleek-home-review/Publication Jun. 20, 2018 (last updated) 20 pages.

* cited by examiner

COUPLING SYSTEM FOR HAND HELD DEVICE AND BASE

This application is the U.S. National Phase application under 35 U.S.C. § 371 of International Application No. PCT/EP2020/073140, filed on Aug. 19, 2020, which claims the benefit of U.S. Application Ser. No. 62/889,122, filed Aug. 20, 2019. These applications are hereby incorporated by reference herein.

FIELD OF THE INVENTION

The present disclosure is directed to hand held device and base docking systems, and in particular, to magnetic coupling systems to dock hand held devices on their bases.

BACKGROUND

Hand held devices, such as oral irrigators, are often used in conjunction with a base on which the hand held device can be docked. The hand held device may be docked to temporarily hold the hand held device, to place the hand held device so that it is oriented properly, to charge the hand held device, and/or for a variety of other uses. When using magnetic coupling, it is difficult to balance a low force of removal with stability of the hand held device within the dock. Accordingly, there is a continued need to develop coupling mechanisms for hand held devices and accompanying bases.

SUMMARY OF THE INVENTION

The present disclosure is directed to a magnetic coupling system to improve stability at low magnetic docking forces. Generally, two magnets are placed in an attractive orientation and an auxiliary magnet is inverted and spaced apart from the magnetic coupling. Applicant has appreciably recognized that having an auxiliary magnet in such an orientation provides resistance against sliding of a hand held device in the downward direction that increases robustness to downward and gravitational force.

Generally, in one aspect, a coupling system for a hand held device and a base is provided. The system comprises: the base comprising a first magnet arranged in the base to have polarity in a first direction; and the hand held device comprising a second magnet, arranged in the hand held device to have polarity in a first direction and an auxiliary magnet spaced at a distance from the second magnet, wherein the auxiliary magnet is arranged in the hand held device to have polarity in a second direction opposite the first direction.

In an aspect, when the hand held device is positioned next to the base with the second magnet positioned across from the first magnet, the first magnet and the auxiliary magnet have a repulsive force between them in a third direction, wherein the third direction is opposite the direction of a force of gravity on the hand held device and orthogonal to the first direction.

In an aspect, when the hand held device is positioned next to the base with the second magnet positioned across from the first magnet, the first magnet and second magnet have an attractive force between them in the first direction.

In an aspect, the first magnet is fixedly secured within a housing of the base.

In an aspect, the second magnet and the auxiliary magnet are fixedly secured within a housing of the hand held device and the auxiliary magnet is spaced at a distance in the third direction from the second magnet.

In an aspect, the first magnet, the second magnet, or the auxiliary magnet are comprised of magnetic material and backirons.

In an aspect, the force required to separate the hand held device from the base in the third direction is less than the force required in a fourth direction opposite the third direction.

Generally, in one aspect, a coupling system for a hand held device and a base is provided. The system comprises: the base comprising an auxiliary magnet arranged in the base to have polarity in a first direction and a first magnet arranged in the base to have polarity in a second direction spaced at a distance from the auxiliary magnet; and the hand held device comprising a second magnet arranged in the handheld device to have polarity in the second direction.

In an aspect, when the hand held device is positioned next to the base with the second magnet positioned across from the first magnet, the second magnet and the auxiliary magnet have a repulsive force between them in the third direction, wherein the third direction is opposite the direction of a force of gravity on the hand held device and orthogonal to the first direction.

In an aspect, when the hand held device is positioned next to the base with the second magnet positioned across from the first magnet, the first magnet and the second magnet have an attractive force between them in the second direction.

In an aspect, the second magnet is fixedly secured within a housing of the hand held device.

In an aspect, the first magnet and the auxiliary magnet are fixedly secured within a housing of the base.

In an aspect, the first magnet is spaced at a distance in the third direction from the auxiliary magnet.

In an aspect, the first magnet, the second magnet, or the auxiliary magnet are comprised of magnetic material and backirons.

In an aspect, the force required to separate the hand held device from the base in the third direction is less than the force required in a fourth direction opposite the third direction.

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
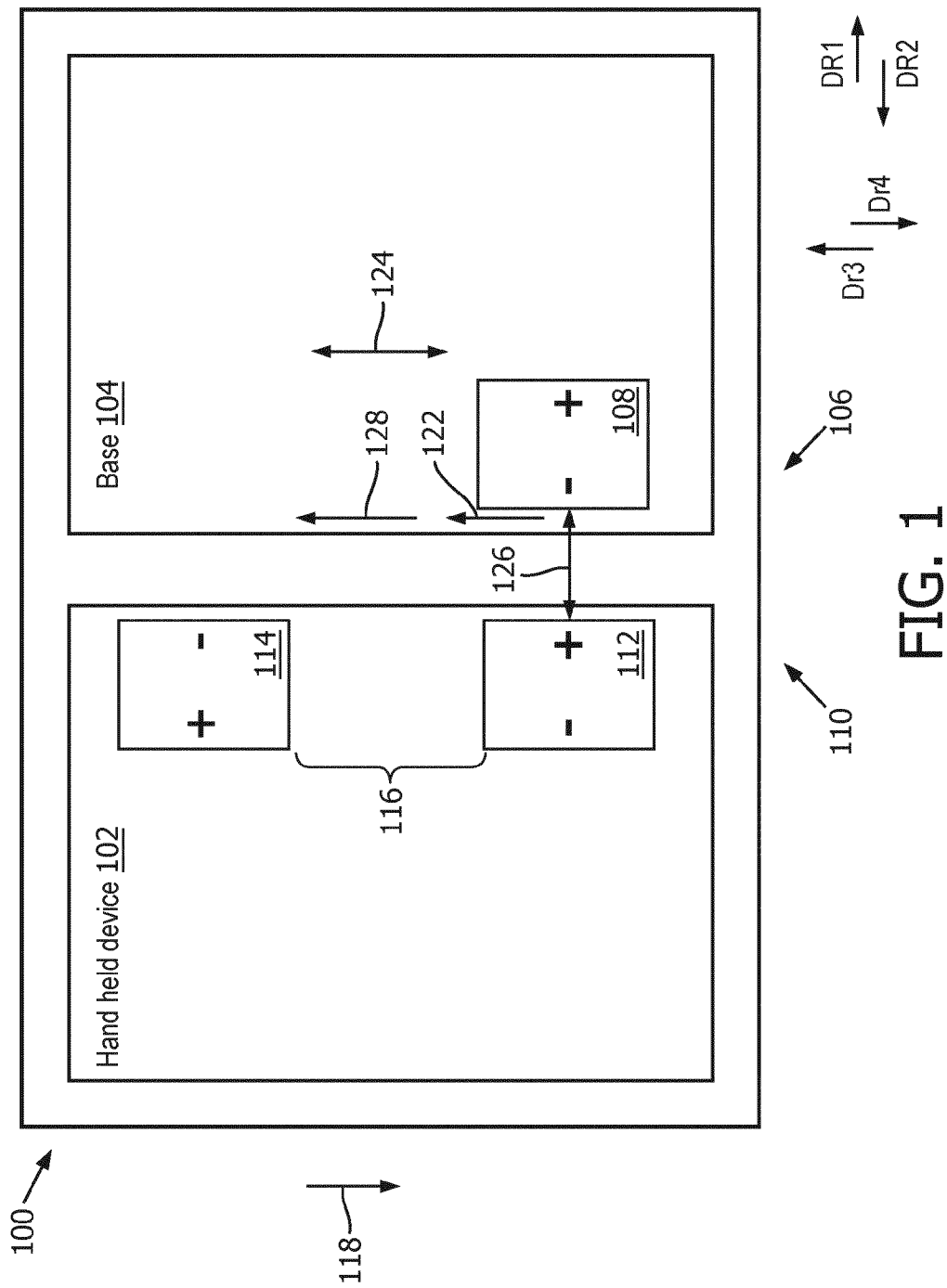
FIG. 1 is a schematic illustration of a handheld device and base according to aspects of the present disclosure.

The present disclosure is directed to a magnetic coupling system to improve stability at low magnetic docking forces. Generally, two magnets are placed in attractive orientation and an auxiliary magnet is inverted and spaced apart from the magnetic coupling. Applicant has appreciably recognized that having an auxiliary magnet in such an orientation provides resistance against sliding of a hand held device in the downward direction that increases robustness to downward and gravitational force.

In one example, the auxiliary magnet may be arranged within the hand held device at a predetermined distance from another magnet within the hand held device. The auxiliary magnet is optimally arranged with polarity in the opposite direction as the other two magnets. The placement of the auxiliary magnet in the hand held device with reverse polarity creates a repulsive force between the auxiliary magnet and the magnet in the base. If the hand held device starts to slip downwards off its docked position, for example, due to the weight of hand held device, the movement of the hand held device in the downward direction, which brings the auxiliary magnet closer to the magnet in the base, causes an increase in the repulsive force between the auxiliary magnet and the magnet in the base. This repulsive force can counter the force of gravity on the hand held device and keep the hand held device docked to the base.

As another example, the auxiliary magnet may be arranged within the base at a fixed distance from another magnet arranged within the base. The auxiliary magnet has an opposite polarity as the other two magnets, one in the base and the other in the hand held device. By this arrangement, there is a repulsive force between the magnet in the hand held device and the auxiliary magnet such that if the hand held device experiences a downward force, for example due to the weight of the hand held device, the repulsive force between the magnet in the hand held device and the auxiliary magnet in the base can help to keep the hand held device from falling further down and becoming undocked.

The term "hand held device" is intended to mean an electronic or non-electronic device which typically has a small enough mass and is small enough in size to be held or moved by a user. Hand held devices can include electronic devices such as phones, tablets, PDAs, portable music players, personal care devices such as oral irrigators, electric toothbrushes, tongue scrappers, flossers, shavers, or medical care devices, or can include non-electronic devices such as mechanical tools, personal care devices such as mirrors or haircare tools, or consumer goods. A base is a device with which the hand held device makes physical contact, for example, to temporarily hold the hand held device, to place the hand held device so that it is oriented properly, to charge the hand held device, and/or for a variety of other uses. As an example, the base may be vertically oriented so that when the hand held device makes physical contact with and docks with the base, the base is not completely below the hand held device and is instead adjacent to it.

Referring to the figures, FIG. 1 is a schematic illustration of a coupling system 100 for a hand held device 102 and base 104. The base 104 has a housing 106 within which a first magnet 108 is fixedly secured. As an example, the first magnet 108 is fixedly secured along an inner surface of the housing 106 of the base 104. The hand held device 102 has a housing 110 within which a second magnet 112 and auxiliary magnet 114 are fixedly secured. As an example, the second magnet 112 and auxiliary magnet 114 are fixedly secured along an inner surface of the housing 110 of the hand held device 102. The first magnet 108 and the second magnet 112 both have north seeking poles on the sides of the magnets facing in a first direction DR1 and south seeking poles on the side of the magnets facing a second direction DR2. Alternatively, the first magnet 108 and the second magnet 112 both could have south seeking poles on the sides of the magnets facing in the first direction DR1 and north seeking poles on the sides of the magnets facing the second direction DR2. The polarity of the first magnet 108 and the polarity of the second magnet 112 are directed in the first direction DR1. An auxiliary magnet 114 is spaced at a distance 116 from the second magnet 112 in a third direction DR3, which is orthogonal to the first direction DR1. The auxiliary magnet 114 has a south seeking pole on the side of the magnet facing in the first direction DR1 and a north seeking magnet on the side of the magnet facing in the second direction DR2. Alternatively, the auxiliary magnet 114 could have a north seeking pole on the side of the magnet facing in the first direction DR1 and a south seeking magnet on the side of the magnet facing in the second direction DR2.

When the hand held device 102 is positioned next to the base 104, for example, for docking the hand held device 102, such that the first magnet 108 is across from the second magnet 112 in the first direction DR1 (or alternatively, in the second direction DR2), the first magnet 108 and the second magnet 112 have an attractive force 126 between them in the first direction DR1 and/or the second direction DR2. The south seeking pole of the first magnet 108 is positioned across from the north seeking pole of the second magnet 112, and an attractive force 126 exists between the opposite magnetic poles. The first magnet 108 applies an attractive force on the second magnet 112 in the first direction DR1, and the second magnet 112 applies an attractive force on the first magnet 108 in the second direction DR2. When the hand held device 102 is positioned next to the base 104 such that the first magnet 108 is across from the second magnet 112 in the first direction DR1 (or alternatively, in the second direction DR2), there is a repulsive force 124 between the first magnet 108 and the auxiliary magnet 114. The south seeking pole of the first magnet 108, which is the closest pole of the first magnet 108 to the auxiliary magnet 114, repels the south seeking pole of the auxiliary magnet 114, which is the closest pole of the auxiliary magnet 114 to the first magnet 108. The auxiliary magnet 114 applies a repulsive force 124 on the first magnet 108 in the fourth direction DR4, and the first magnet 108 applies a repulsive force 124 on the auxiliary magnet 114 in the third direction DR3. The auxiliary magnet 114 is located at a distance 116 away from the second magnet 112 in the third direction DR3, and also located at a distance 116 in the third direction DR3 from the first magnet 108 when the first magnet 108 and second magnet 112 are aligned in the first direction DR1. When the hand held device 102 experiences a force in the fourth direction DR4, for example, due to the force of gravity 118 acting on the mass of the hand held device 102 in the fourth direction DR4, and moves in the fourth direction DR4, the auxiliary magnet 114 moves closer to the first magnet 108. Because the first magnet 108 and auxiliary magnet 114 have polarities that repel each other, a resistive force 128 is created on the hand held device 102 in the third direction DR3 caused by the repulsive force 124 between the first magnet 108 and the auxiliary magnet 114.

The magnetic coupling between the first magnet 108 and the second magnet 112 causes two forces on the first magnet 108 in two directions, as shown in FIG. 1. The primary force is a magnetic force 126 in the second direction DR2. The secondary force is a magnetic shear force 122 generated as a frictional force from the primary magnetic force 126 which acts as a normal force. These two forces are related by the coefficient of friction which is less than 1. As a result, the magnetic shear 122 force is smaller than the primary magnetic force 126. A small shear magnetic force 122 compared to a high primary magnetic force 126 is not desirable for easy undocking and stability. To ease removal of the hand held device 102 from the base 104 when undocking, the primary magnetic force 126 should be as low as possible to allow for easy undocking. A low primary magnetic force 126 also reduces the risk that the hand held device 102 and/or base 104 will tip over during removal of the hand held device 102 from the base 104. A high shear force 122 has a few advantages. A high magnetic shear force 122 creates a more stable coupling of the hand held device 102 to the base 104, and reduces the likelihood that the hand held device 102 will slide down and off the vertically oriented base 104 due to the force of gravity or due to impact, for example, when the hand held device 102 and base 104 are placed down on a surface. However, the strength of the magnetic shear force 122 on the first magnet 108 is limited by the coefficient of friction and the strength of the magnetic attractive force 126 between the first magnet 108 and the second magnet 112. The addition of the auxiliary magnet 114 with reverse polarity as the first magnet 108 and the second magnet 112 creates an additional force in the direction of the magnetic shear force 122, the third direction DR3. The auxiliary magnet 114 adds a repulsive force 124 against the first magnet 108 to increase resistance against the force in the fourth direction DR4 generated by the weight of the hand held device 102. When the hand held device 102 slides in the downward direction, the fourth direction DR4, the resistive force 128, caused by the repulsive force 124 of the auxiliary magnet 114 acting on the first magnet 108, increases as the hand held device 102 slides downward, resisting the hand held device 102 sliding downward.

Figure 2:
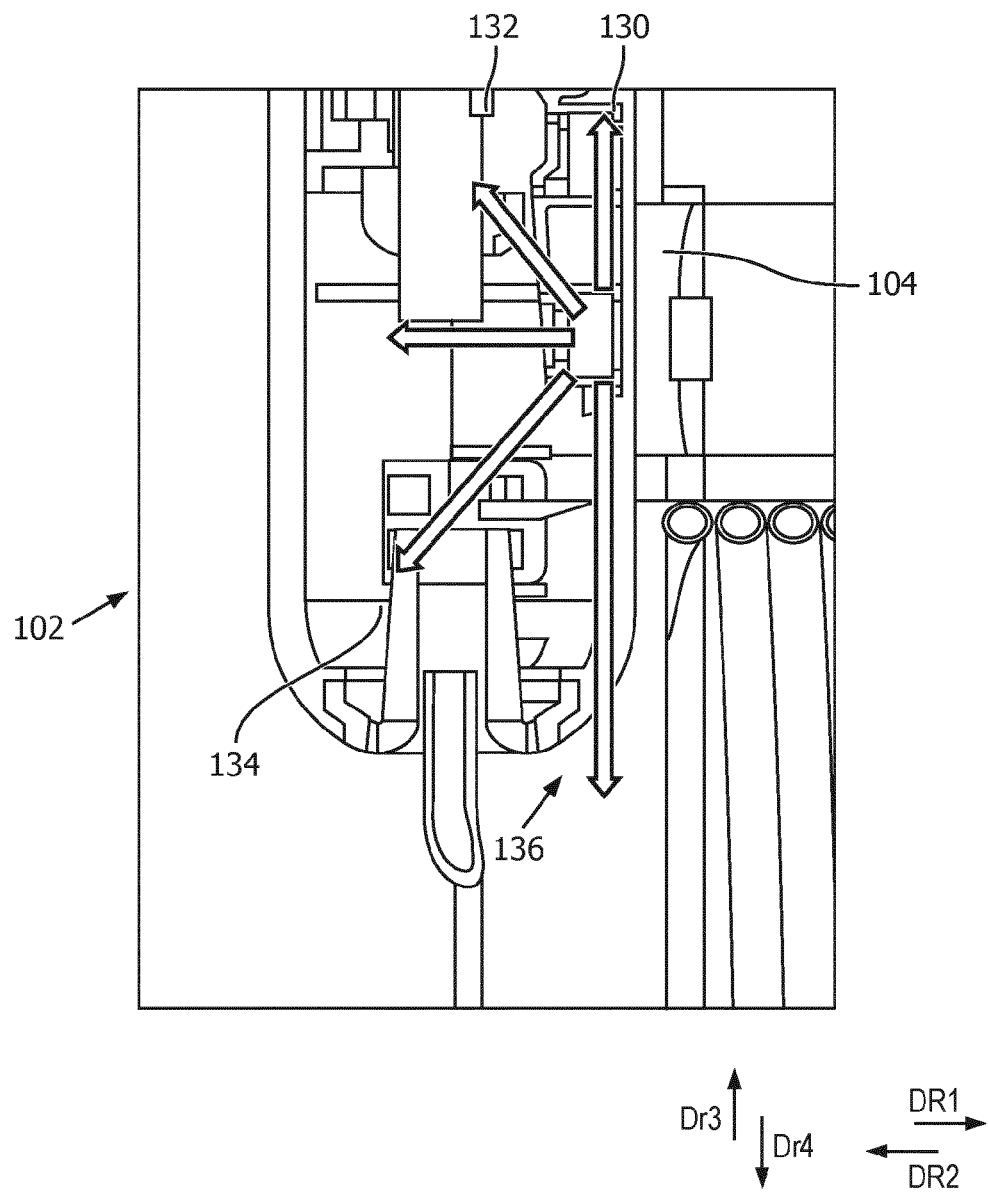
FIG. 2 is a schematic illustration of a handheld device and base according to aspects of the present disclosure.

The configuration shown in FIG. 1 has several advantages. For example, one advantage is a reduction in the undocking force required. To remove the hand held device 102 from the base 104 requires less force because there is less attractive force 126 between the first magnet 108 and the second magnet 112. Because the undocking force required by a user is reduced, there is also less risk of the product tipping. Another advantage is that the hand held device 102 and docking base 104 are more securely connected, which reduces the likelihood that the hand held device 102 will fall due to gravity when docked. This additionally makes the hand held device 102 and docking base 104 more stable, which reduces the chance that the hand held device 102 becomes undocked if the hand held device 102 and docking base 104 should be dropped or fall. An additional benefit of this configuration is that the force profile over various pull directions, shown in FIG. 2, is changed by the inclusion of the auxiliary magnet 114 (shown in FIG. 1). When a user undocks the hand held device 102, a user tends to pull in the upward direction (along path 130 or path 132), in the third direction DR3. In the third direction, the removal force is lower than in the fourth direction DR4 because the reverse polarity magnet, the auxiliary magnet 114, has a repulsive force 124 with the first magnet 108 (shown in FIG. 1), creating a force in the same direction as a user is undocking the hand held device. When the user applies a force in the fourth direction DR4, downward (along path 134 or path 136), to redock the hand held device 102, the force between the hand held device 102 and the base 104 is greater as the reverse polarity magnet, the auxiliary magnet 114, resists moving towards the first magnet 108 on the base 104. The first magnet, second magnet, or auxiliary magnet may be made of any material which interacts with another material due to a magnetic force, and can be a permanent magnet made of a ferromagnetic material or an electromagnet. A backiron may be used in conjunction with magnetic material to improve the strength of the magnetic connection using lower cost materials. It should be appreciate that the strength of the magnets and the distance between the magnets may depend, for example, on the geometry of hand held device and base, the mass of the hand held device, the materials used in the hand held device, other magnetic materials located within the hand held device and base, and/or a variety of other factors.

Figure 3:
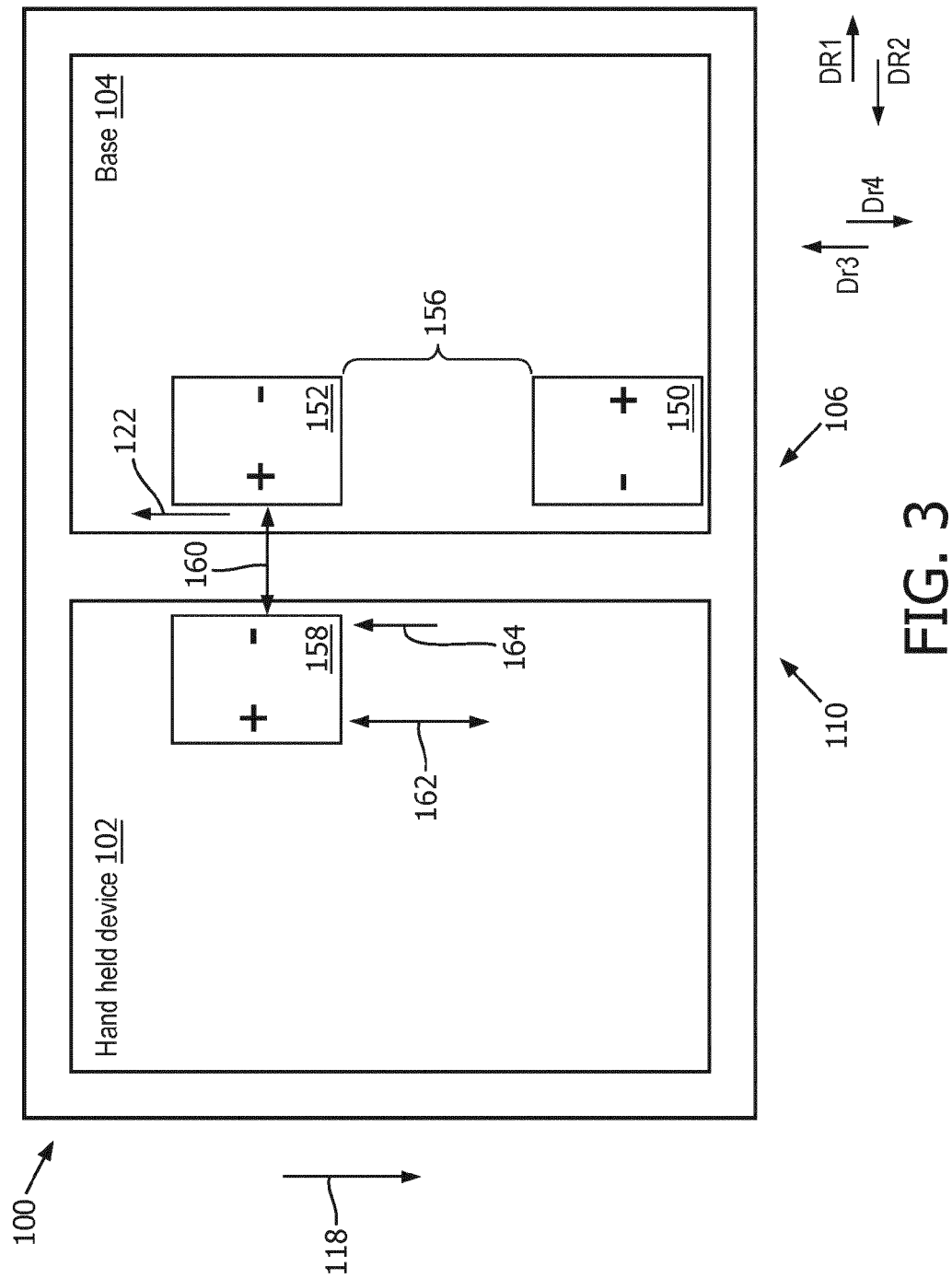
FIG. 3 is a schematic illustration of a handheld device and base according to aspects of the present disclosure.

FIG. 3 illustrates another exemplary coupling system 100 for a hand held device 102 and base 104 where an auxiliary magnet 150 is arranged in the base 104. The base 104 has a housing 106 within which a first magnet 152 and an auxiliary magnet 150 are fixedly secured. As an example, the first magnet 152 and the auxiliary magnet 150 are fixedly secured along an inner surface of the housing 106 of the base 104 at a distance 156 from each other in a third direction DR3 which is orthogonal to the first direction DR1 and second directions DR2. The hand held device 102 has a housing 110 within which a second magnet 158 is fixedly secured. As an example, the second magnet 158 is fixedly secured along an inner surface of the housing 110 of the hand held device 102. The first magnet 152 and second magnet 158 both have north seeking poles on the sides of the magnets facing in a second direction DR2 and south seeking poles on the sides of the magnets facing a first direction DR1. Alternatively, the first magnet 152 and second magnet 158 could have south seeking poles on the sides of the magnets facing in the second direction DR2 and north seeking poles on the sides of the magnets facing the first direction DR1. The polarity of the first magnet 152 and the polarity of the second magnet 158 are directed in the second direction DR2. An auxiliary magnet 150 is spaced at a distance 156 from the first magnet 152 in a fourth direction DR4, which is orthogonal to the first direction DR1. The auxiliary magnet 150 has a south seeking pole on the side of the magnet facing in the second direction DR2 and a north seeking magnet on the side of the magnet facing in the first direction DR1. Alternatively, the auxiliary magnet 150 could have a south seeking pole on the side of the magnet facing in the first direction DR1 and a north seeking magnet on the side of the magnet facing in the second direction DR2.

When the hand held device 102 is positioned next to the base 104, for example, for docking the hand held device 102, such that the first magnet 152 is across from the second magnet 158 in the first direction DR1 (or alternatively, in the second direction DR2), the first magnet 152 and the second magnet 158 have an attractive force 160 between them in the first direction DR1 and/or the second direction DR2. The north seeking pole of the first magnet 152 is positioned across from the south seeking pole of the second magnet 158, and an attractive force 160 exists between the opposite magnetic poles. The first magnet 152 applies an attractive force on the second magnet 158 in the first direction DR1, and the second magnet 158 applies an attractive force on the first magnet 152 in the second direction DR2.

When the hand held device 102 is positioned next to the base 104 such that the first magnet 152 is across from the second magnet 158 in the first direction DR1 (or alternatively, in the second direction DR2), there is a repulsive force 162 between the second magnet 158 and the auxiliary magnet 150. The south seeking pole of the second magnet 158, which is the closest pole of the second magnet 158 to the auxiliary magnet 150, repels the south seeking pole of the auxiliary magnet 150, which is the closest pole of the auxiliary magnet 150 to the second magnet 158. The second magnet 158 applies a repulsive force 162 on the auxiliary magnet 150 in the fourth direction DR4, and the auxiliary magnet 150 applies a repulsive force 162 on the second magnet 158 in the third direction DR3. The auxiliary magnet 150 is located at a distance 156 away from the first magnet 152 in the fourth direction DR4, and also located at a distance 156 in the fourth direction DR4 from the second magnet 158 when the first magnet 152 and second magnet 158 are aligned in the first direction DR1. When the hand held device 102 experiences a force in the fourth direction DR4, for example, due to the force of gravity 118 acting on the mass of the hand held device 102 in the fourth direction DR4, and moves in the fourth direction DR4, the second magnet 158 moves further towards the auxiliary magnet 150. Because the auxiliary magnet 150 and second magnet 158 have polarities that repel each other, a resistive force 164 is created on the hand held device 102 in the third direction DR3 caused by the repulsive force 162 between the auxiliary magnet 150 and the second magnet 158. The exemplary coupling system 100 for a hand held device 102 and base 104 illustrated in FIG. 3 has the same or similar benefits as the coupling system 100 illustrated in FIG. 1. As an example, as shown in FIG. 2, when a user undocks the hand held device 102, a user tends to pull in the upward direction (along path 130 or path 132), in the third direction DR3. In the third direction, the removal force is lower than in the fourth direction DR4 because the auxiliary magnet 150 in the base 104 repels the second magnet 158 in the hand held device 102 (shown in FIG. 3), creating a force in the same direction as a user is undocking the hand held device.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A coupling system for a hand held device and a base, the system comprising:
    the base comprising a first magnet arranged in the base to have polarity in a first direction; and
    the hand held device comprising a second magnet, arranged in the hand held device to have polarity in a first direction, and an auxiliary magnet spaced at a distance from the second magnet, wherein the auxiliary magnet is arranged in the hand held device to have polarity in a second direction opposite the first direction
    wherein when the hand held device is positioned next to the base with the second magnet positioned across from the first magnet in the first direction, the first magnet and the auxiliary magnet have a repulsive force between them in a third direction wherein the third direction is orthogonal to the first direction.

2. The system of claim 1, wherein when the hand held device is positioned next to the base with the second magnet positioned across from the first magnet, the first magnet and second magnet have an attractive force between them in the first direction.

3. The system of claim 1, wherein the first magnet is fixedly secured within a housing of the base.

4. The system of claim 1, wherein the second magnet and the auxiliary magnet are fixedly secured within a housing of the hand held device and wherein the auxiliary magnet is spaced at a distance in the third direction from the second magnet.

5. The system of claim 1, wherein the first magnet, the second magnet, or the auxiliary magnet are comprised of magnetic material and backirons.

6. A coupling system for a hand held device and a base the system comprising:
    the base comprising an auxiliary magnet arranged in the base to have polarity in a first direction and a first magnet arranged in the base to have polarity in a second direction spaced at a distance from the auxiliary magnet and the hand held device comprising a second magnet arranged in the handheld device to have polarity in the second direction
    wherein when the hand held device is positioned next to the base with the second magnet positioned across from the first magnet in the first direction, the second magnet and the auxiliary magnet have a repulsive force between them in a third direction,
    wherein the third direction is orthogonal to the first direction.

7. The system of claim 6, wherein when the hand held device is positioned next to the base with the second magnet positioned across from the first magnet, the first magnet and the second magnets have an attractive force between them in the second direction.

8. The system of claim 6, wherein the second magnet is fixedly secured within a housing of the hand held device.

9. The system of claim 6, wherein the first magnet and the auxiliary magnet are fixedly secured within a housing of the base.

10. The system of claim 6, wherein the first magnet is spaced at a distance in the third direction from the auxiliary magnet.

11. The system of claim 6, wherein the first magnet the second magnet, or the auxiliary magnet are comprised of magnetic material and backirons.

* * * * *